United States Patent

[11] 3,544,040

[72] Inventor John J. Bundschuh
Penfield, New York
[21] Appl. No. 798,071
[22] Filed Feb. 10, 1969
[45] Patented Dec. 1, 1970
[73] Assignee Eastman Kodak Company
Rochester, New York
a corporation of New Jersey

[54] TAKE-UP THREADING IMPROVEMENT FOR AUTOMATIC STRIP HANDLING DEVICE
10 Claims, 3 Drawing Figs.

[52] U.S. Cl. .................................................. 242/206,
242/74, 242/210
[51] Int. Cl. ........................................... G11b 15/66,
G03b 1/04, B65h 75/28
[50] Field of Search .......................................... 242/195,
210, 206, 179, 71.1, 74, 197, 198; 352/157, 158,
72, 78

[56] References Cited
UNITED STATES PATENTS
3,208,682 9/1965 Pastor et al. .................... 242/195X
3,282,521 11/1966 Schuller et al. ................ 242/210
3,414,206 12/1968 Ramig, Jr. .................... 242/210X
FOREIGN PATENTS
1,358,086 2/1964 France .......................... 242/210

Primary Examiner—George F. Mautz
Attorneys—Robert W. Hampton and J. Addison Mathews ABSTRACT: A takeup mechanism for directing strip material onto a rotatable hub member in a device for handling such material includes a plurality of elongated strip-guiding fingers equally spaced about the hub member and having adjacent first and second curved surfaces on the sides of the fingers facing the hub member. The first of said curved surfaces on each finger is configured to direct the strip material toward the hub while the second of said curved surfaces on each finger is configured to direct the strip material toward the first curved surface of the adjacent finger. Moreover, said first and second curved surfaces on each finger define a nub or raised portion between the surfaces configured to be the only portion on the finger which engages the strip material regardless of the amount of such material on the hub member.

Patented Dec. 1, 1970　　3,544,040

JOHN J. BUNDSCHUH
INVENTOR.

BY J. Addison Mathews

Robert W. Hampton

ATTORNEYS

3,544,040

TAKE-UP THREADING IMPROVEMENT FOR AUTOMATIC STRIP HANDLING DEVICE

BACKGROUND OF THE INVENTION

The present invention relates to takeup mechanisms for strip-material handling devices, such as motion picture projectors or the like, and more particularly to improvements in such mechanisms which direct strip material onto a takeup hub for storing the strip material.

It is known to provide strip-material handling devices, such as motion picture cameras and projectors, with takeup systems employing a takeup reel for storing the strip material and means on or adjacent the takeup reel for threading the strip material onto the reel during an automatic threading cycle of the device. One such known takeup threading means, disclosed in Agfa German published application Ser. No. 1,187,914, published Feb. 25, 1965, comprises three guide fingers mounted on a motion picture camera in equally spaced relationship about the periphery of a takeup reel. The fingers extend between the reel flanges substantially tangential to the hub of the reel and the ends of the fingers adjacent the hub are curved around the hub to guide film onto the hub.

Another known type of takeup threading means, disclosed in Foster et al. U.S. Pat. No. 2,051,789, issued Apr. 18, 1936, comprises two film guiding members which extend from the projector film threading path into and between the flanges of a takeup reel and which cooperate to define an entrance channel or extended threading path to the hub of the reel, and a circular chamber completely enclosing the hub of the reel. As film is fed from the projector threading path through the entrance channel and into the chamber, it is guided around the hub and cinched onto the hub by the interior surfaces of the chamber.

Previously known mechanisms for threading film onto a takeup reel suffer from numerous disadvantages and have not been entirely satisfactory in recently developed fully automatic projectors. For example, previous takeup threading means of the type which employ a plurality of guide fingers equally spaced about the periphery of the takeup reel have a substantial area on the fingers which continues to contact film on the hub even after several convolutions of film have been threaded onto the hub. This continued and substantial contact results mainly from the shape of the fingers at their ends adjacent the hub where the fingers curve around the hub at a constant distance from the hub surface. Because of this large contact area, the fingers offer substantial frictional resistance to rotation of the reel after several convolutions of film have been threaded onto the reel. Moreover, as film is wound into a roll on the reel hub, and the diameter of the film roll increases, the area of contact between the finger and the roll moves from adjacent one end of the finger toward the other end of the finger. Since the fingers are pivotally mounted and spring biased against the roll at their ends remote from the roll, this movement of the area of contact along the finger changes the effective lever arm through which the spring bias on the fingers exerts pressure against the roll. Accordingly, the resistance to rotation of the roll due to its contact with the fingers varies with the diameter of the roll.

Previously known takeup threading means of the type which define a circular chamber around the hub suffer from disadvantages similar to those set forth above. Moreover, threading means of this type often require additional mechanisms for withdrawing the guide members from the hub after the film is threaded onto the hub, and the guide members often must be constructed from relatively heavy sheet material in order to obtain the necessary rigidity of such guide members. Accordingly, such threading means often require complex and heavy mechanisms.

These and other problems associated with previously known takeup threading means are further compounded when used in recently developed motion picture projectors which include sophisticated automatic mechanisms for removing film from a supply cartridge and for rewinding the film back into the cartridge when projection is completed. In projectors of this type, the takeup reel may be enclosed in a chamber where it is unavailable to correct any malfunctions in the threading operation. It is, therefor, mandatory that the guiding fingers or members operate smoothly and without malfunction or interference with movement of the film or rotation of the takeup reel.

SUMMARY OF THE INVENTION

It is an object of the present invention to provide a takeup mechanism for a strip-material handling device, which will thread strip material onto a rotatable supporting hub without possibility of malfunction.

It is a further object of the invention to provide a simple mechanism of the above type which will impart a constant as well as relatively insubstantial frictional resistance to rotation of the hub regardless of the amount of strip material supported on the hub.

In accordance with a preferred embodiment of the invention a motion picture projector, having means for feeding film toward the hub of a takeup reel rotatably supported on the projector, is provided with three guide fingers spaced radially from the hub of the reel and spaced circumferentially about the periphery of the reel. The fingers are pivotally mounted on the projector for movement between a first position adjacent and substantially tangential to the hub and a second position retracted from the hub. Each of the fingers includes a side closest to the hub which defines first and second adjacent arcuate surfaces; the first arcuate surface of each finger being configured to direct film toward the hub and the second arcuate surface of each finger being configured to direct the film toward the first curved surface of an adjacent finger. The first and second curved surfaces define a nub or raised portion therebetween and on one edge of the finger, which raised portion is configured to be the closest point on the finger to film on the hub regardless of the amount of film on the hub. Moreover, the fingers exert a constant and insubstantial resistance to rotation of the roll through a substantially single line contact between the fingers and one edge of the film regardless of the amount of film on the reel.

DESCRIPTION OF A PREFERRED EMBODIMENT

Figure 1:
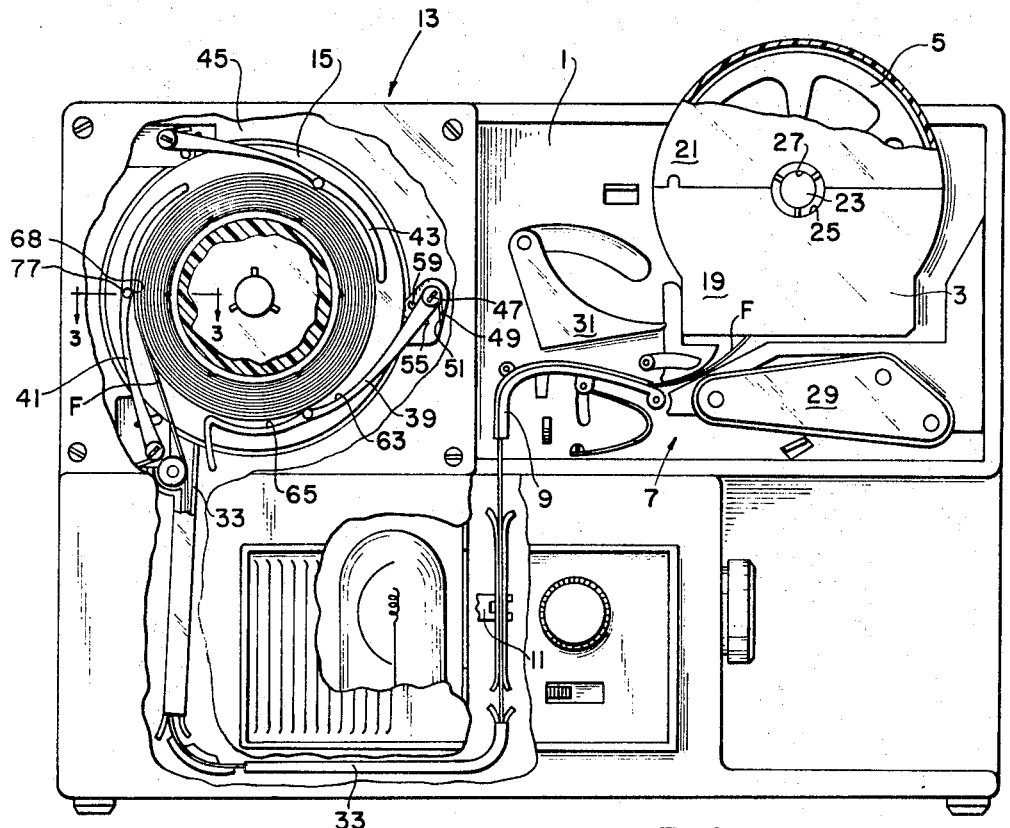
FIG. 1 is a front elevational view of a motion picture projector having a portion of the projector housing cut away to show a takeup mechanism in accordance with the present invention.

Referring now to the drawings, a preferred embodiment of the invention is disclosed on a motion picture projector comprising a projector housing 1, a film supply cartridge 3 containing a supply reel 5, a stripping mechanism 7 for removing film F from the cartridge during a threading cycle of the projector and for threading the film along means defining a film path 9 to a film pulldown claw 11, and a takeup chamber 13 containing a takeup reel 15. The various features of the projector, other than the takeup mechanism, are either well known in the art or are clearly illustrated and described in previously filed applications such as commonly assigned copending U.S. Pat. application Ser. No. 643,502 entitled CINEMATOGRAPHIC CARTRIDGE PROJECTOR APPARATUS filed June 5, 1967 in the name of Bundschuh et al. Briefly however and by way of background, supply cartridge 3 comprises first and second cartridge parts 19 and 21, respectively, which cooperate to enclose and protect supply reel 5.

The cartridge and enclosed supply reel are adapted to be supported on a projector with a projector spindle 23 extending through an opening 25 in the sidewalls of the cartridge and into reel core 27 to rotatably and drivingly support the reel on the projector and in the cartridge. Stripping mechanism 7 for removing film from the cartridge comprises a driving belt 29 and a stripping finger 31 which are adapted to enter the cartridge through openings in the bottom thereof (not shown). During an automatic threading operation, belt 29 engages the film on the reel and rotates the reel in a direction to unwind film therefrom while finger 31 picks up the leading end of film from the reel and guides the film from the cartridge. Stripping mechanism 7 continues to remove film from the cartridge and to direct the film into the projector threading path 9 until pulldown claw 11 becomes effective to engage the film and to further feed the film through the projector and toward the takeup reel 15, at which time mechanism 7 is withdrawn from the cartridge. Upon reaching the takeup reel, the film is guided toward the reel hub 34, in a manner more fully described hereinafter, where it is engaged by teeth 35 extending from a slip clutch 37, as is described more fully in Babcock U.S. Pat. No. 3,298,625, issued Jan. 17, 1967. The film is pulled around the hub by teeth 35 and is cinched onto the reel hub as takeup reel 15 continues to rotate and wind successive convolutions of film onto the hub. Upon completion of the projection cycle the film is automatically rewound from the takeup reel back into the supply cartridge 5 by an automatic rewind mechanism such as the mechanism disclosed in Roman U.S. Pat. No. 3,300,155 issued Jan. 24, 1967.

Figures 2, 3:
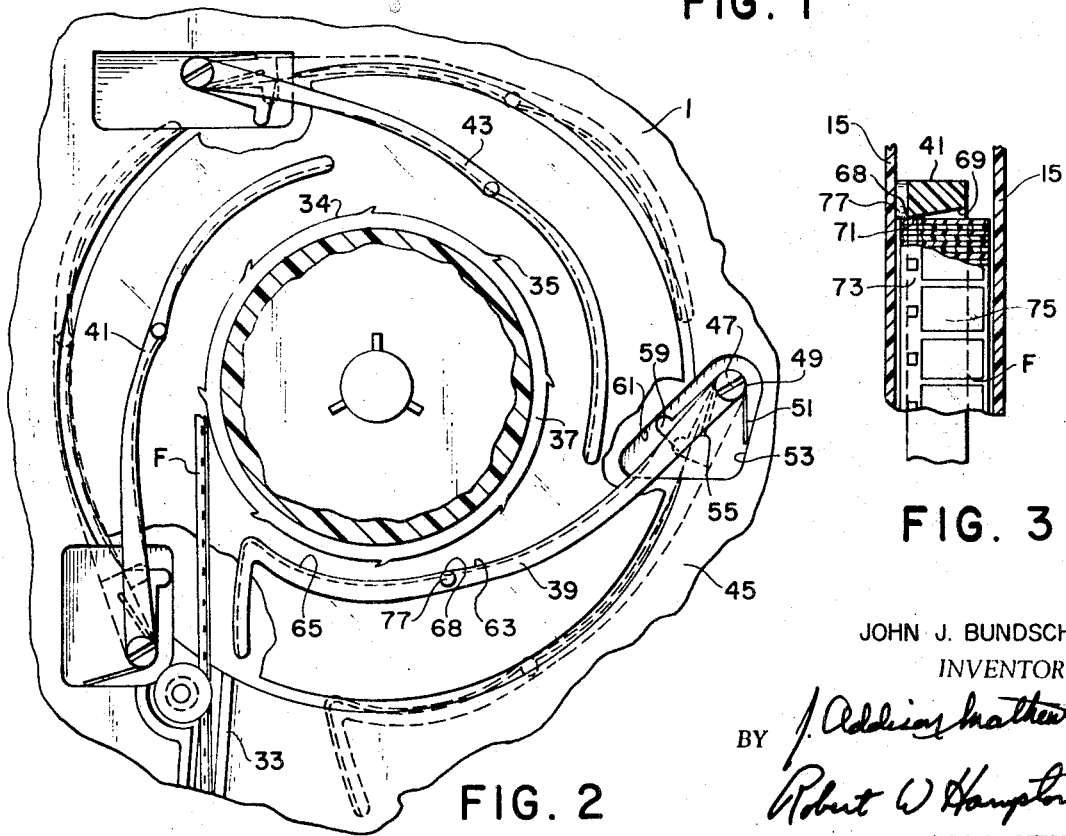
FIG. 2 is an enlarged fragmentary view of a portion of the projector depicted in FIG. 1 showing guide fingers of the mechanism configured in accordance with the present invention.
FIG. 3 is a fragmentary sectional view taken along section line 3-3 of FIG. 1 and showing the manner in which the guide fingers rest upon film on the hub with substantially single line contact along only one edge of the film.

Referring now more particularly to details of the present invention and to FIGS. 2 and 3, a takeup mechanism is disclosed comprising a plurality of guiding members illustrated as arms or fingers 39, 41, and 43 equally spaced radially from the reel hub and circumferentially about the hub. Members 39, 41, and 43 are substantially identical in shape and operation and therefore further description of the features thereof will be made in connection with member 39, it being understood that such description applies equally to all of the members. The guiding members are pivotally mounted at one end of the members to a supporting wall 45 of projector housing 1 by means of pivot pins or screws 47 which extend through a circular bore in the members and into a threaded bore in support wall 45. Each guiding member is mounted for movement between a first position adjacent the hub of the takeup reel wherein the member extends substantially tangential to the hub as shown in solid lines in FIG. 2, and a second position retracted from the hub as shown in dotted lines in FIG. 2. Moreover, each member is urged about its respective pivot pin 47 and toward the first position by resilient means such as a spring 49, soiled about the pivot pin and having a first end 51 engaging a recessed surface 53 of support wall 45 and a second end 55 engaging a surface of the member to urge the member toward the hub. While each guide member is urged toward the hub, it is prevented from engaging the hub by a stop means illustrated as a nub 59 on the member which is adapted to engage recessed surface 61 on support wall 45 when the member is in its first position adjacent the hub.

During the threading cycle of the projector, the film is guided between guide members 39 and 41 by means defining the projector threading path 33. Upon entering between members 39 and 41, surfaces on member 41, to be described more fully hereinafter, direct the film toward the hub 34 and film engaging teeth 35. Should guide member 41 fail to properly thread the film onto the hub, adjacent guide member 43 again will direct the film toward the hub. Similarly, guide member 39 will direct the film toward the hub in the event member 43 fails to properly thread the film onto the hub. Moreover, since the fingers define a substantially closed chamber about the hub, the film will be cinched onto the hub as successive convolutions are wound thereon even if all of the fingers fail to cause teeth 35 to positively engage the film by directing the film toward the hub. After the film is threaded onto the hub and as successive convolutions are wound thereon, the guide members, which continue to ride on the outer film convolution, move outwardly about pivot pin 47 toward their retracted position shown in dotted lines in FIG. 2.

Referring now more particularly to the configuration of the guide members or fingers, each member has one side closest to the takeup reel which defines first and second adjacent arcuate surfaces or portions 63 and 65 respectively and a raised portion in the form of a nub or built-up area 68 between the arcuate surfaces. These arcuate portions of the fingers are configured such that the first arcuate portion of each finger will direct film toward the hub of the takeup reel while the second arcuate portion of each finger will direct film toward the first arcuate portion of the adjacent finger. Moreover, these arcuate portions are arranged such that the nub or raised portion therebetween will be the radially closest point on each guide member to the hub of the reel regardless of the pivotal position of the finger.

As shown most clearly in FIG. 3, nub or raised portion 63 is tapered from one edge 69 of the finger toward the other edge 71 of the finger such that only one edge 71 of the portion 63 will ride on the outer convolution of film as the film is fed into a roll on the film. As disclosed, such edge is adapted to engage the film along a perforated edge 73 thereof in a manner which will prevent scratching of the picture area 75 of the film as the film roll rotates in engagement with the finger.

Nub or raised portion 68 may further have an extended portion illustrated as a head or abutment 77 which protrudes beyond the edge 71 of the finger in an axial direction substantially parallel to the axis of rotation of the takeup reel. This head or abutment 77 protrudes outwardly from the finger and into engagement with flange 15 of the takeup reel to locate the finger relative to flange 15 and to limit the area of contact and reduce the frictional resistance to rotation between the finger and the flange.

In order to provide a fail-safe takeup mechanism the length of each arm is substantially equal to the circumferential distance between the arms and the first arcuate surface of each arm is configured and positioned such that the end portion 79 of one arm will move along an arc closely spaced from the first curved surface of the adjacent arm as the one arm is pivoted on the projector. In this manner, the film, once it enters the chamber defined by the arms, will be prevented from escaping therefrom regardless of forward or reverse curl on the film.

From the above description, it should now be apparent that the guide members engage the outer convolution of film on the reel with substantially single line contact on only one edge of the film. Moreover, the arcuate portions 63 and 65 and the raised portion 68 of the guide members are configured such that this line contact remains at substantially the same position on the members regardless of the amount of film on the reel.

Further, extended head portion 77 engages a flange of the reel to locate the finger relative to the flange without substantially restraining rotation of the reel.

While the subject invention has been illustrated and described in connection with a particular projector and takeup reel, it should be understood that the takeup threading mechanism will operate equally well with other projectors or reels and with other strip handling devices such as tape recorders.

The invention has been described in detail with particular reference to preferred embodiments thereof, but it will be understood that variations and modifications can be effected within the spirit and scope of the invention.

I claim:

1. In a device for handling strip material, the device having a hub for storing such material and means for feeding such material toward the hub, a takeup mechanism comprising: a plurality of guide members mounted on the device in spaced relationship about the hub for movement between for first positions adjacent the hub wherein strip material fed toward the hub by the feeding means will be directed into engagement with the hub by said members, and second positions retracted from the hub to permit movement of the members away from the hub as strip material is wound onto the hub, each of said guide members being configured to engage the strip material on the hub at only a single location on each member and with substantially line contact regardless of the amount of strip material on the hub.

2. The improvement claimed in claim 1, wherein said line contact remains substantially at the same location on each guide member regardless of the amount of strip material on the hub.

3. A mechanism for directing strip material onto a hub rotatably supported in a device for handling such material, wherein the hub includes film engaging means for threading film onto the hub and the device includes means for rotating the hub and for feeding the strip material toward the hub, the mechanism comprising:

a plurality of elongate arms mounted on the device for movement between first positions wherein the arms extend in close proximity to the hub for directing strip material onto the hub, and second positions wherein the arms are retracted from the hub; each of said arms have one side facing the hub, said one side defining first and second adjacent arcuate portions and a raised portion between said arcuate portions, said first arcuate portion of each finger being configured to direct the strip material toward the hub and said second arcuate portion of each finger being configured to direct the strip material toward the first arcuate portion of an adjacent finger; and means for urging said arms toward the first positions thereof, whereby strip material fed toward the hub by the device will be directed onto the hub and into contact with the film engaging means when said arms are in the first positions and the arms will be moved toward their second positions as film is wound onto the hub by rotation of the hub.

4. A mechanism as claimed in claim 3 wherein the length of each of said arms is substantially equal to the circumferential distance between the arms and the first arcuate portion of each finger is configured such that the end of one arm will move along an arc closely spaced from the first arcuate portion of an adjacent arm as the one arm and adjacent arm are pivoted on the device; thereby preventing escape of the strip material from between the arms.

5. A mechanism as claimed in claim 3, wherein each of said arms includes means for preventing pivotal movement of the arms into engagement with the hub.

6. A mechanism as claimed in claim 3, wherein said raised portion is configured to engage the strip material along only one edge of the strip material.

7. A cinematographic device for handling motion picture film, the device including a takeup reel having a hub for supporting the film, means for rotating the reel to wind film onto the reel, means for feeding the film through the device and toward the reel, and a mechanism for directing film fed toward the reel onto the hub of the reel, said mechanism comprising:

a plurality of elongate fingers mounted on the projector in spaced relationship about said reel for movement between a first position adjacent the hub member and a second position retracted from said hub member, each of said fingers having a first portion for directing the film toward the hub and a second portion for engaging film on the hub, said second portion being configured to engage the film with substantially line contact regardless of the amount of film on the hub; and means for urging said fingers toward the first positions thereof, whereby strip material fed toward the hub by the device will be directed onto the hub when said arms are in the first positions and the arms will be moved toward their second positions by the second portion thereof as film is wound onto the hub.

8. A cinematographic device as claimed in claim 7 wherein each of said fingers has a second arcuate portion for directing the film toward the first arcuate portion of an adjacent finger and for preventing film from escaping between the fingers.

9. In a motion picture projector adapted to rotatably support a takeup reel having a film supporting hub and a flange extending radially outwardly from the hub, a film guiding mechanism comprising:

at least one elongated member pivotally mounted on the projector for movement between a first position adjacent the hub and a second position retracted from the hub; said member being configured to direct film into engagement with the hub in the first position of the member; and abutment means on the member adapted to slidably engage the flange for locating the member relative to the flange.

10. A film guiding mechanism as claimed in claim 9, wherein said abutment means comprises a head member extending outwardly from the elongated member and toward the flange to engage the flange, and wherein the head member is configured to be the only portion of the elongated member which engages the flange thereby to limit the frictional resistance to rotation exerted on the reel by the elongated member.